UNITED STATES PATENT OFFICE.

GEORGE N. JEPPSON, OF WORCESTER, MASSACHUSETTS, AND LEWIS E. SAUNDERS, OF NIAGARA FALLS, NEW YORK, ASSIGNORS TO NORTON COMPANY, OF WORCESTER, MASSACHUSETTS, A CORPORATION OF MASSACHUSETTS.

ELECTRIC-FURNACE PRODUCT AND METHOD OF MAKING SAME.

954,808.     Specification of Letters Patent.     Patented Apr. 12, 1910.

No Drawing.     Application filed March 26, 1909. Serial No. 485,902.

*To all whom it may concern:*

Be it known that we, (1) GEORGE N. JEPPSON and (2) LEWIS E. SAUNDERS, citizens of the United States, residing at (1) Worcester and (2) Niagara Falls, in the counties of (1) Worcester and (2) Niagara and States of (1) Massachusetts and (2) New York, have invented certain new and useful Improvements in Electric-Furnace Products and Methods of Making Same, of which the following is a specification.

This invention relates to the preparation of bonded articles from an artificially prepared electric furnace product consisting essentially of alumina substantially free from fluxing impurities and having a crystalline structure.

In the preparation in the electric furnace of abrasive and refractory materials consisting mainly of alumina, it has been customary to calcine commercial impure bauxite in order to expel as much of its water as is practicable, and thereafter to fuse the material in an electric furnace between carbon electrodes, usually with the addition to the charge of a small proportion of carbon, the effect of which is to reduce certain of the impurities commonly present in commercial grades of bauxite. The resulting product is massive in character, varies greatly in color in accordance with the amount and character of the impurities, and contains varying proportions of silicon, iron, titanium and calcium as oxids, the combined oxids of these metals usually comprising ten to twenty-five per cent. by weight of the product.

We have discovered that the above-mentioned impurities, even when present in relatively very small proportions, profoundly modify the physical characteristics of the product and its properties as related to certain industrial uses: and that by eliminating said impurities to a sufficient extent, as hereinafter set forth, we are enabled to prepare an aluminous material which when subsequently crushed, graded and bonded, possesses novel and valuable characteristics, as hereinafter fully set forth. The bonded article produced in accordance with our invention possesses certain distinguishing characteristics or properties which render it particularly suited for abrasive purposes, and notably for such special uses as the internal grinding of articles of steel, iron or the like.

The impurities which are normal constituents of aluminous materials as heretofore prepared in the electric furnace are oxidized compounds, and appear to possess the property of forming with the alumina more or less definite chemical compounds, which not only have a lower melting point than substantially pure alumina, but which exert a remarkable and profound influence on its other physical properties, rendering it relatively tough or resistant to crushing, imparting to it a massive character, and affecting what may be here referred to as its "temper." By the term "temper" is meant the conditions under which fracture occurs and the character of the fracture under conditions of use.

Referring specifically to the use of aluminous materials in the form of grinding wheels, it should be understood that the operation known as grinding is in fact a cutting process, in which the cutting tools are hard, sharp particles of abrasive projecting from the working face of the wheel. These cutting points eventually become dull from use, and in order that the grinding wheel should do most efficient work, they should then break out from the bond by which they are held, and thus expose new cutting points. If the grade of the wheel, *i. e.*, the strength of the bond by which the cutting particles are held, is too hard, the wheel becomes dull, glazes, and burns the work, requiring frequent renewal of its cutting face by dressing. If, on the other hand, the wheel is too soft in grade, the particles break away before their cutting efficiency is lost, and the wheel is worn with unnecessary rapidity. It follows from this that the character of the bond must be carefully adapted to that of the abrasive.

As distinguished from abrasives prepared by electric furnace fusion from commercial bauxite, which are relatively tough, massive in character, and resistant to fracture, the grains of alumina substantially free from the fluxing impurities, and prepared under suitable temperature conditions as hereinafter described, are found to possess such peculiar quality of "temper," combined with an essentially crystalline structure, that under the conditions of use they remain *in situ* until their cutting points or edges become dulled, and then break with a sharp, crisp fracture, giving fresh, keen cutting edges. For this reason the effective life of the individual grains is much longer, and they may be assembled with a much harder bond than is the case with grains prepared from impure or partially purified commercial forms of alumina as heretofore exclusively used. It results from these peculiar properties that the wheels not only last longer, but are applicable to purposes for which wheels prepared from commercial forms of alumina are not well adapted.

In preparing grains suited for bonding and possessing the peculiar qualities of temper above described, we prefer to proceed as follows: Alumina substantially free from oxids of iron, silicon, or titanium, is melted in an electric furnace between graphite electrodes, the charge being fed more rapidly than is the practice with impure alumina. It results from this relatively rapid feeding and from the use of graphite electrodes as distinguished from ordinary carbon that the product undergoes but little reduction, possesses an essentially crystalline structure, and is not contaminated with large amounts of aluminum carbid, the effect of the presence of which is to cause the mass to disintegrate on long exposure. The more rapid the feeding, the more pronounced are those characteristics of temper which impart to the material its distinctive qualities as an abrasive. The resulting pig or mass, usually nearly or quite white in color, and usually possessing a very marked crystalline structure, is broken up, crushed, and preferably subjected to an oxidizing roast to remove traces of carbid and to improve its bonding qualities. The particles are then graded and molded into the desired articles or implements by means of an appropriate bond, preferably a ceramic bond.

Various bonds may be used, a bond suitable for the purpose comprising a mixture of one part of ball clay with one part of feldspar, four ounces of this mixture being used for each pound of abrasive grains. Wheels so bonded possess the above described characteristic that under conditions of use the abrasive grains fracture in the bond, thus always presenting fresh and keen cutting points and edges to the work. In this respect the wheel differs radically from those heretofore prepared from impure or partially purified bauxite or other commercial forms of alumina, the grains of which become dulled and glazed, and then break out from the bond without fracturing to any important extent, the bond being carefully prepared to admit of this effect without which the efficiency of the wheel would be greatly diminished, the work would be burned, and the wheel would require frequent renewal of its cutting face by dressing.

It is impracticable to specify any fixed percentage of impurities which renders the product unsuited for the purposes above mentioned, as for the specific purpose of internal grinding, as this depends upon the quality or chemical nature of the impurities. In general it may be stated, however, that the total impurities in the product should not exceed five per cent., that the percentage of oxids of silica and titanium should not exceed one per cent. each, and the percentage of iron oxid should preferably not exceed one-half per cent. For purposes of illustration we will give an analysis of a product having those qualities of temper which adapt it in a very high degree for the specific purpose of internal grinding:

| | |
|---|---|
| $Al_2O_3$ | 99.64 |
| $TiO_2$ | None |
| $SiO_2$ | 0.20 |
| $Fe_2O_3$ | 0.16 |
| CaO | None |
| | 100.00 |

For comparison with the above the following is an analysis of an exceptionally high grade of electric furnace alumina as heretofore prepared from the best quality of commercial bauxite which has undergone partial purification during the electric furnace fusion, the same exhibiting a degree of toughness and a massive character which, while imparting to it a high value as an abrasive or refractory for general purposes, renders it unsuited for the specific purpose of internal grinding:

| | |
|---|---|
| $Al_2O_3$ | 92.32 |
| $TiO_2$ | 3.04 |
| $SiO_2$ | 1.12 |
| $Fe_2O_3$ | 1.77 |
| CaO | 1.75 |
| | 100.00 |

We claim:—

1. The herein-described electric furnace method, which consists in melting alumina substantially free from fluxing impurities, permitting the product to solidify into a crystalline mass, crushing and grading the same, and bonding the grains by a bond having sufficient strength to hold the grains until they fracture under conditions of use.

2. The herein-described electric furnace method, which consists in melting alumina containing less than five per cent. of total impurities, permitting the product to solidify into a crystalline mass, crushing and grading the same, and bonding the grains by a bond having sufficient strength to hold the grains until they fracture under conditions of use.

3. The herein-described electric furnace method, which consists in melting alumina containing not more than one per cent. each of the oxids of silicon, titanium and iron, permitting the product to solidify into a crystalline mass, crushing and grading the same, and bonding the grains by a bond having sufficient strength to hold the grains until they fracture under conditions of use.

4. The herein-described method, which consists in melting alumina substantially free from fluxing impurities in an electric furnace between graphite electrodes, permitting the product to solidify into a crystalline mass, crushing and grading the same, and bonding the grains by a bond having sufficient strength to hold the grains until they fracture under conditions of use.

5. The herein-described electric furnace method, which consists in melting alumina substantially free from fluxing impurities by feeding the same rapidly between graphite electrodes, thereby avoiding substantial reduction of the mass, permitting the product to solidify into a crystalline mass, crushing and grading the same, and bonding the grains by a bond having sufficient strength to hold the grains until they fracture under conditions of use.

6. The herein-described electric furnace method, which consists in melting alumina substantially free from fluxing impurities, permitting the product to solidify into a crystalline mass, crushing the same, subjecting the particles to an oxidizing roast, and bonding the grains by a bond having sufficient strength to hold the grains until they fracture under conditions of use.

7. The herein-described new article of manufacture, consisting of alumina substantially free from fluxing impurities in the form of hard and relatively brittle grains possessing a crystalline structure, said grains assembled by a bond having sufficient strength to hold the grains until they fracture under conditions of use.

In testimony whereof, we affix our signatures in presence of two witnesses.

GEORGE N. JEPPSON.
LEWIS E. SAUNDERS.

Witnesses as to George N. Jeppson:
S. F. HALL,
ALDUS C. HIGGINS.

Witnesses as to Lewis E. Saunders:
C. P. TOWNSEND,
ALDUS C. HIGGINS.